(12) United States Patent
Johnson et al.

(10) Patent No.: US 11,085,317 B2
(45) Date of Patent: Aug. 10, 2021

(54) CMC BOAS ASSEMBLY

(71) Applicant: United Technologies Corporation, Farmington, CT (US)

(72) Inventors: Dean W. Johnson, Springvale, ME (US); Thomas E. Clark, Sanford, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 76 days.

(21) Appl. No.: 16/570,338

(22) Filed: Sep. 13, 2019

(65) Prior Publication Data
US 2021/0079803 A1    Mar. 18, 2021

(51) Int. Cl.
*F01D 9/04* (2006.01)
*F01D 11/08* (2006.01)
*F01D 25/24* (2006.01)

(52) U.S. Cl.
CPC .............. *F01D 11/08* (2013.01); *F01D 25/24* (2013.01); *F05D 2220/32* (2013.01); *F05D 2300/6033* (2013.01)

(58) Field of Classification Search
CPC .......... F01D 9/04; F01D 11/005; F01D 11/08; F01D 11/125; F01D 25/24; F01D 25/246; F05D 2220/32; F05D 2240/11; F05D 2240/55; F05D 2260/30; F05D 2300/6033; F05D 2300/6034
See application file for complete search history.

(56) References Cited

U.S. PATENT DOCUMENTS

| | | | |
|---|---|---|---|
| 6,315,519 B1 | 11/2001 | Bagepalli et al. | |
| 2003/0133790 A1* | 7/2003 | Darkins, Jr. | F01D 9/04 415/139 |
| 2007/0025837 A1 | 2/2007 | Pezzetti, Jr. | |
| 2008/0206046 A1* | 8/2008 | Razzell | F01D 9/04 415/173.1 |

(Continued)

FOREIGN PATENT DOCUMENTS

| | | |
|---|---|---|
| EP | 3081759 | 10/2016 |
| EP | 3255252 | 12/2017 |
| GB | 2484188 | 4/2012 |

OTHER PUBLICATIONS

EP Partial Search Report for EP Application No. 20194519.3 dated Nov. 11, 2020.

(Continued)

*Primary Examiner* — Igor Kershteyn
(74) *Attorney, Agent, or Firm* — Carlson, Gaskey & Olds, P.C.

(57) ABSTRACT

A blade outer air seal includes a base portion. A first wall and a second wall extend radially from the base portion. The first wall is axially spaced from the second wall. The first and second walls extend in a circumferential direction. A first hook extends from the first wall and a second hook extends from the second wall. The first and second hooks extend in an axial direction towards one another to form a passage that extends in the circumferential direction. The passage is configured to receive a carrier. A tab extends radially outward from the second hook. The tab is configured to engage with the carrier.

19 Claims, 6 Drawing Sheets

(56) References Cited

U.S. PATENT DOCUMENTS

| | | | |
|---|---|---|---|
| 2012/0082540 A1* | 4/2012 | Dziech | F01D 11/005 415/173.1 |
| 2014/0223920 A1 | 8/2014 | Stevens | |
| 2016/0333741 A1 | 11/2016 | Stapleton | |
| 2017/0350268 A1* | 12/2017 | McCaffrey | F01D 11/08 |

OTHER PUBLICATIONS

EP Extended Search Report for EP Application No. 20194619.3 dated Feb. 23, 2021.

* cited by examiner

US 11,085,317 B2

CMC BOAS ASSEMBLY

BACKGROUND

This application relates to a blade outer air seal assembly.

Gas turbine engines are known and typically include a compressor compressing air and delivering it into a combustor. The air is mixed with fuel in the combustor and ignited. Products of the combustion pass downstream over turbine rotors, driving them to rotate.

It is desirable to ensure that the bulk of the products of combustion pass over turbine blades on the turbine rotor. As such, it is known to provide blade outer air seals radially outwardly of the blades. Blade outer air seals have been proposed made of ceramic matrix composite fiber layers.

SUMMARY OF THE INVENTION

In one exemplary embodiment, a blade outer air seal includes a base portion. A first wall and a second wall extend radially from the base portion. The first wall is axially spaced from the second wall. The first and second walls extend in a circumferential direction. A first hook extends from the first wall and a second hook extends from the second wall. The first and second hooks extend in an axial direction towards one another to form a passage that extends in the circumferential direction. The passage is configured to receive a carrier. A tab extends radially outward from the second hook. The tab is configured to engage with the carrier.

In a further embodiment of any of the above, a second tab extends radially outward from the second hook to form an opening between the tab and the second tab.

In a further embodiment of any of the above, the first and second walls, the first and second hooks, and the base portion have the same thickness.

In a further embodiment of any of the above, the blade outer air seal is a ceramic material.

In a further embodiment of any of the above, the blade outer air seal is formed from a plurality of laminate plies.

In a further embodiment of any of the above, the blade outer air seal is formed from twelve or fewer laminate plies.

In another exemplary embodiment, a carrier for a blade outer air seal includes a base that extends from a first axial side to a second axial side and from a first circumferential side to a second circumferential side. A first rail and a second rail extend radially outward from the base. The first and second rails are spaced apart from one another in an axial direction. The first rail is spaced from the first axial side to form a front base portion and the second rail is spaced from the second axial side to form an aft base portion. The front and aft base portions are configured to engage with a blade outer air seal segment.

In a further embodiment of any of the above, a slot is formed in at least one of the first and second rails. The slot is configured to receive a pin.

In a further embodiment of any of the above, the slot extends in the circumferential direction.

In a further embodiment of any of the above, the carrier is a ceramic material.

In a further embodiment of any of the above, the carrier is formed from a plurality of laminate plies.

In another exemplary embodiment, a blade outer air seal assembly includes a blade outer air seal that has a plurality of segments that extend circumferentially about an axis and are mounted in a carrier. At least one of the plurality of segments has a first wall and a second wall axially spaced from one another and a base portion that extends from the first wall to the second wall to form a passage between the first and second walls. The carrier has a first rail and a second rail that extend from a base. A portion of the carrier is arranged within the passage.

In a further embodiment of any of the above, a first hook extends from the first wall and a second hook extends from the second wall. The first and second hooks are radially inward of the base of the carrier.

In a further embodiment of any of the above, a tab extends radially outward from the second hook. The tab engages with one of the first rail and the second rail.

In a further embodiment of any of the above, a slot is formed in at least one of the first and second rails. The slot is configured to receive a pin.

In a further embodiment of any of the above, the at least one segment is a ceramic material.

In a further embodiment of any of the above, the carrier is a ceramic material.

In a further embodiment of any of the above, the at least one segment is formed from a plurality of laminate plies.

In a further embodiment of any of the above, the at least one segment is formed from twelve or fewer laminate plies.

In a further embodiment of any of the above, the carrier is a ceramic material.

DETAILED DESCRIPTION

Figure 1:
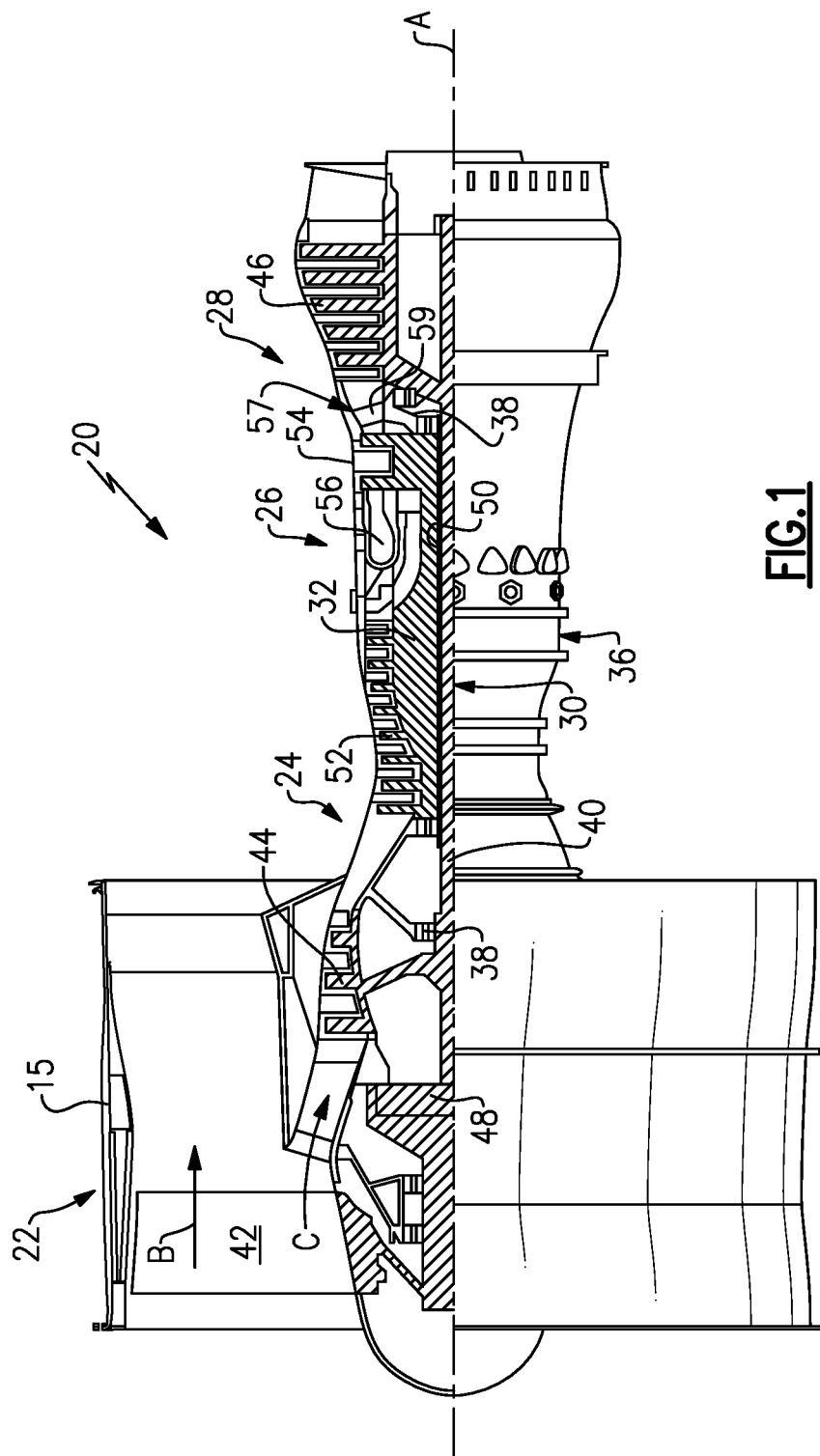
FIG. 1 schematically illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°R)]^{0.5}$. The "Low corrected fan tip speed" as disclosed herein according to one non-limiting embodiment is less than about 1150 ft/second (350.5 meters/second).

Figure 2:
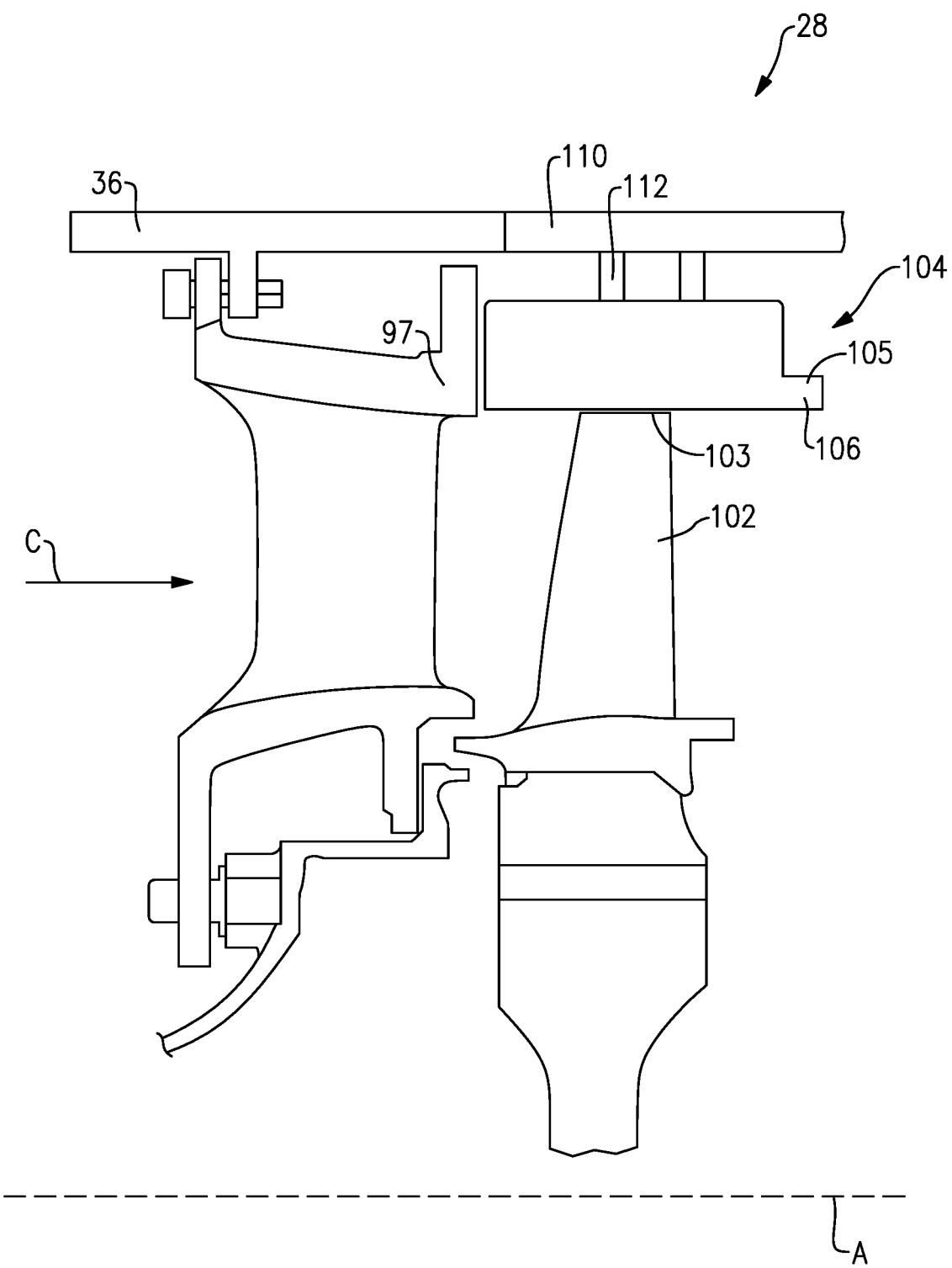
FIG. 2 schematically illustrates an example turbine section.

FIG. 2 shows a portion of an example turbine section 28, which may be incorporated into a gas turbine engine such as the one shown in FIG. 1. However, it should be understood that other sections of the gas turbine engine 20 or other gas turbine engines, and even gas turbine engines not having a fan section at all, could benefit from this disclosure. The turbine section 28 includes a plurality of alternating turbine blades 102 and turbine vanes 97.

A turbine blade 102 has a radially outer tip 103 that is spaced from a blade outer air seal assembly 104 with a blade outer air seal ("BOAS") 106. The BOAS 106 may be made up of a plurality of seal segments 105 that are circumferentially arranged in an annulus about the central axis A of the engine 20. The BOAS segments 105 may be monolithic bodies that are formed of a ceramic material, such as a ceramic matrix composite ("CMC") or monolithic ceramic.

The BOAS 106 may be mounted to an engine case or structure, such as engine static structure 36 via a control ring or support structure 110 and a carrier 112. The engine structure 36 may extend for a full 360° about the engine axis A. The engine structure 36 may support the support structure 110 via a hook or other attachment means. The engine case or support structure holds the BOAS 106 radially outward of the turbine blades 102.

Figure 3:
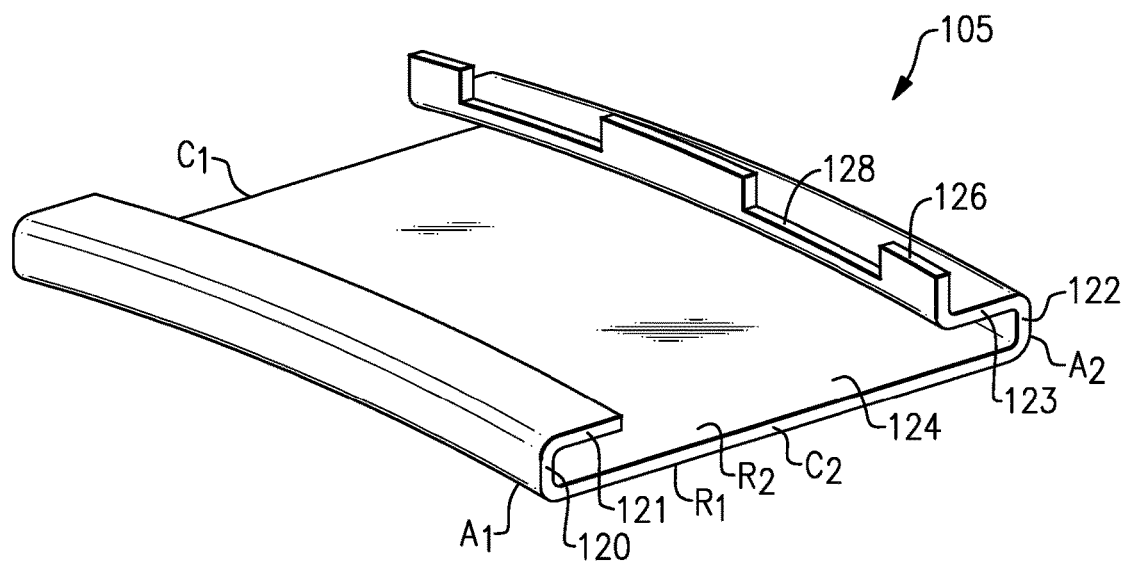
FIG. 3 illustrates an exemplary blade outer air seal.

FIG. 3 illustrates an example BOAS segment 105. Each seal segment 105 is a body that defines radially inner and outer sides R1, R2, respectively, first and second axial sides A1, A2, respectively, and first and second circumferential sides C1, C2, respectively. The radially inner side R1 faces in a direction toward the engine central axis A. The radially inner side R1 is thus the gas path side of the seal segment 105 that bounds a portion of the core flow path C. The first axial side A1 faces in a forward direction toward the front of the engine 20 (i.e., toward the fan 42), and the second axial side A2 faces in an aft direction toward the rear of the engine 20 (i.e., toward the exhaust end).

In the illustrated example, each BOAS segment 105 includes a first wall 120 axially spaced from a second wall 122. The first and second walls 120, 122 extend generally radially outward from a base portion 124. The first and second walls 120, 122 extend along a circumferential width of the seal segment 105. The first wall 120 is arranged at the first axial side A1 and the second wall 122 is arranged at the second axial side A2. The base portion 124 extends between the first and second walls 120, 122 and defines a gas path on a radially inner side and a non-gas path on a radially outer side. A first hook 121 extends axially aft from the first wall 120. A second hook 123 extends axially forward from the second wall 122. The first and second hooks 121, 123 extend towards one another. A plurality of tabs 126 extend radially outward from the second hook 123. The tabs 126 help prevent rotation when the BOAS segment 105 is mounted to the carrier 112. A slot 128 separates the tabs 126. In some examples, the slot 128 receives a pin to secure the BOAS segment 105 to the carrier 112. Although the tabs 126 are shown on the second hook 123, in other embodiments, tabs 126 may extend from the first hook 121. In this disclosure, forward, aft, upstream, downstream, axial, radial, or circumferential is in relation to the engine axis A unless stated otherwise.

Figure 4:
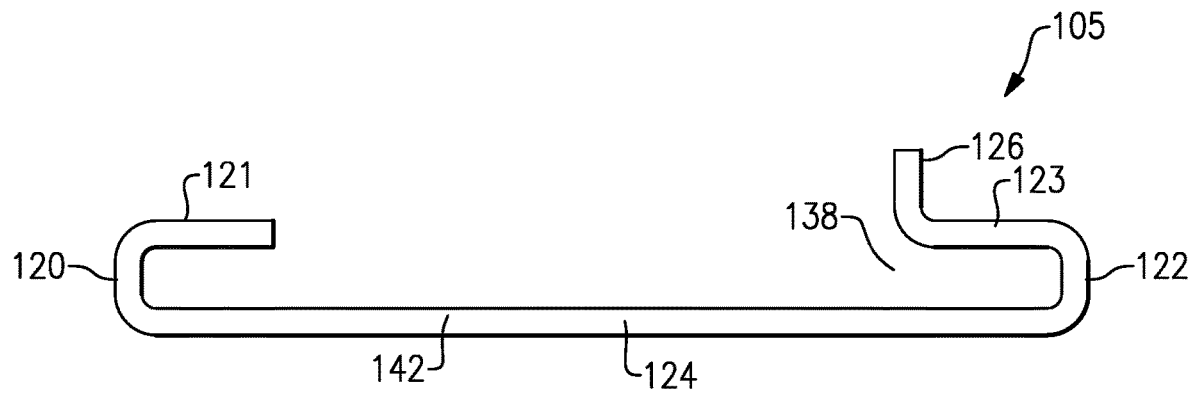
FIG. 4 illustrates a side view of the exemplary blade outer air seal.

FIG. 4 illustrates a side view of the example BOAS segment 105. The first and second hooks 121, 123 form a passage 138 adjacent the base portion 124. The passage 138 extends circumferentially across the base portion 124. The passage 138 is configured to receive the carrier 112 for attaching the BOAS segment 105 to the engine 20.

The BOAS 106 may be formed of a ceramic matrix composite ("CMC") material. Each seal segment 105 is formed of a plurality of CMC laminate plies 142. The laminates may be silicon carbide fibers, formed into a braided or woven fabric in each layer. In other examples, the BOAS 106 may be made of a monolithic ceramic.

CMC components such as BOAS segments 105 are formed by laying fiber material, such as laminate sheets or braids, in tooling, injecting a gaseous infiltrant into the tooling, and reacting to form a solid composite component. The component may be further densified by adding additional material to coat the laminates.

The simple arrangement of the base portion 124 and first and second walls 120, 122 allows for a simple ply layup. The example arrangement keeps the ends of the laminates away from the gas path, which may improve part longevity. The example arrangement has few radial features, which may lower stress from internal thermal gradients. These features allow a thinner BOAS segment 105. In one example, the BOAS segment 105 is formed from twelve or fewer laminate plies 142. In a further example, the BOAS segment 105 is formed from five laminate plies 142. In some examples, the base portion 124, the first and second walls 120, 122, and the first and second hooks 121, 123 may be formed from the same number of laminate plies, and thus have substantially the same thickness.

Figure 5:
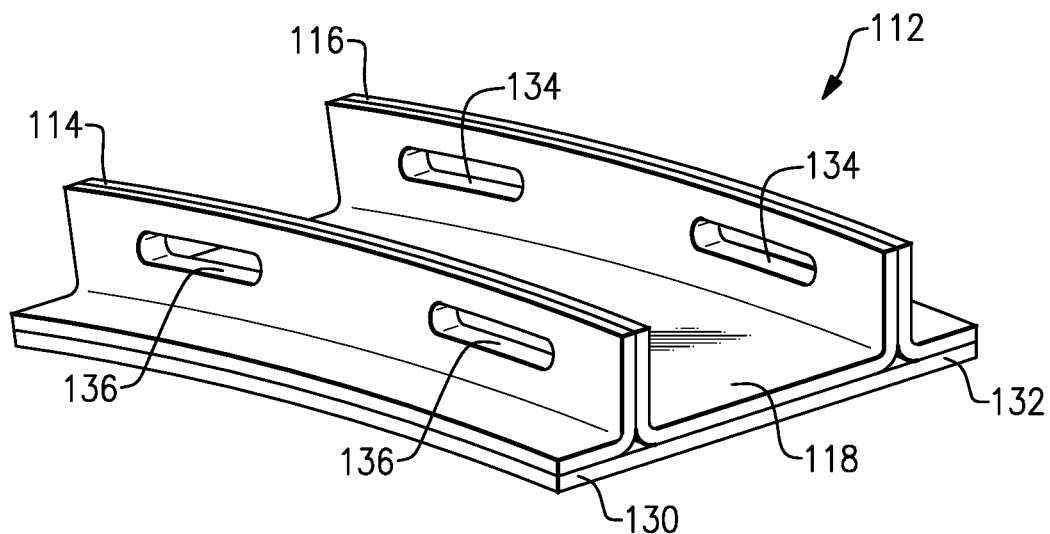
FIG. 5 illustrates an exemplary carrier for a blade outer air seal.

FIG. 5 illustrates an example carrier 112 for the BOAS segment 105. The carrier 112 includes a base 118, and first and second rails 114, 116 extending radially outward from the base 118. The first and second rails 114, 116 extend along a circumferential width of the carrier 112. The first and second rails 114, 116 are spaced from one another in the axial direction. The first rail 114 is spaced from a front edge of the base 118 to form a forward base portion 130. The second rail 116 is spaced from an aft edge of the base 118 to form an aft base portion 132. Slots 136 may be formed in the first rail 114, and slots 134 may be formed in the second rail 116. In the illustrated example, two slots 136 and two slots 134 are arranged in the rails 114, 116. In other examples, more or fewer slots 134, 136 may be utilized. The slots 134, 136 extend through the rails 114, 116 in the axial direction. In one example, the slots 134, 136 are elongate, and extend in the circumferential direction. The slots 134 may have the same shape and size as the slots 136, or may be a different shape and size. The slots 134, 136 are utilized to secure the carrier 112 to the support structure 110.

Figure 6:
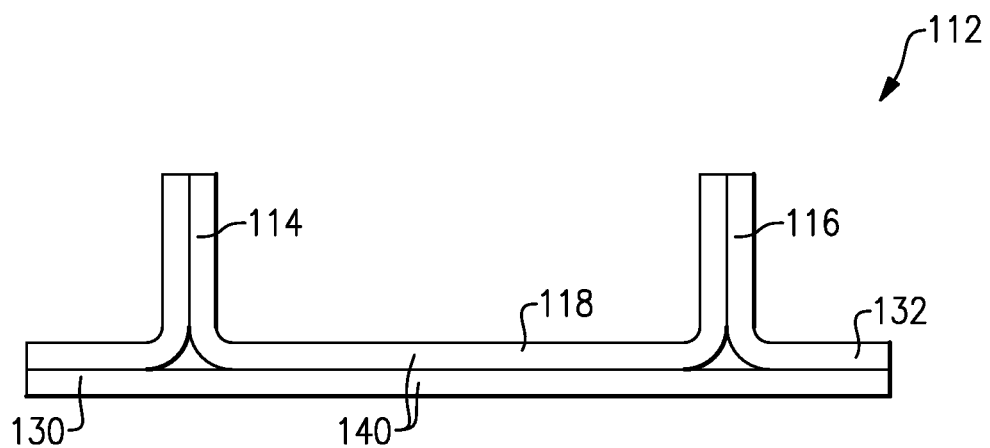
FIG. 6 illustrates a side view of the exemplary carrier.

FIG. 6 illustrates a side view of the example carrier 112. In this example, the first and second rails 114, 116 extend generally perpendicularly from the base 118. In other examples, the first and second rails 114, 116 may extend at an angle relative to the base 118.

The carrier 112 may be formed of a ceramic matrix composite ("CMC") material. The carrier 112 may be formed of a plurality of CMC laminate plies 140. The laminates may be silicon carbide fibers, formed into a braided or woven fabric in each layer. In other examples, the carrier 112 may be made of a monolithic ceramic. Forming the carrier 112 from a ceramic material reduces thermal mismatch between the BOAS segment 105 and the carrier 112.

Figure 7:
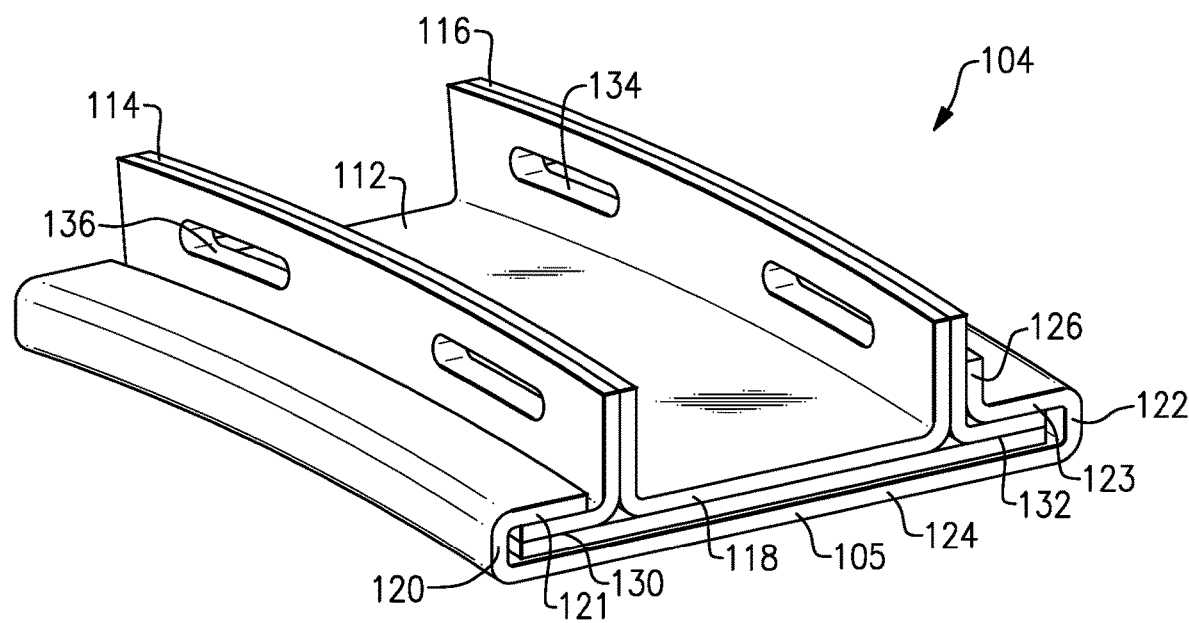
FIG. 7 illustrates a portion of a blade outer air seal assembly.

FIG. 7 illustrates a portion of an example BOAS assembly 104. The base 118 of the carrier 112 is received within the passage 138. The base 118 of the carrier 112 is arranged adjacent the base portion 124 of the BOAS segment 105. The front base portion 130 is arranged near the first wall 120 and the aft base portion 132 is arranged near the second wall 122. The first and second hooks 121, 123 wrap around the base 118, such that they are radially of the base 118.

The disclosed BOAS segment 105 and carrier 112 arrangement permits a large contact area between the BOAS segment 105 and the carrier 112. The BOAS segment 105 contacts the carrier 112 along the entire circumferential width of the BOAS segment 105. This large mating surface allows stresses to be distributed across a large area. In one example, greater than about 25% of the base 118 of the carrier 112 provides a contact surface for the BOAS segment 105.

Figure 8:
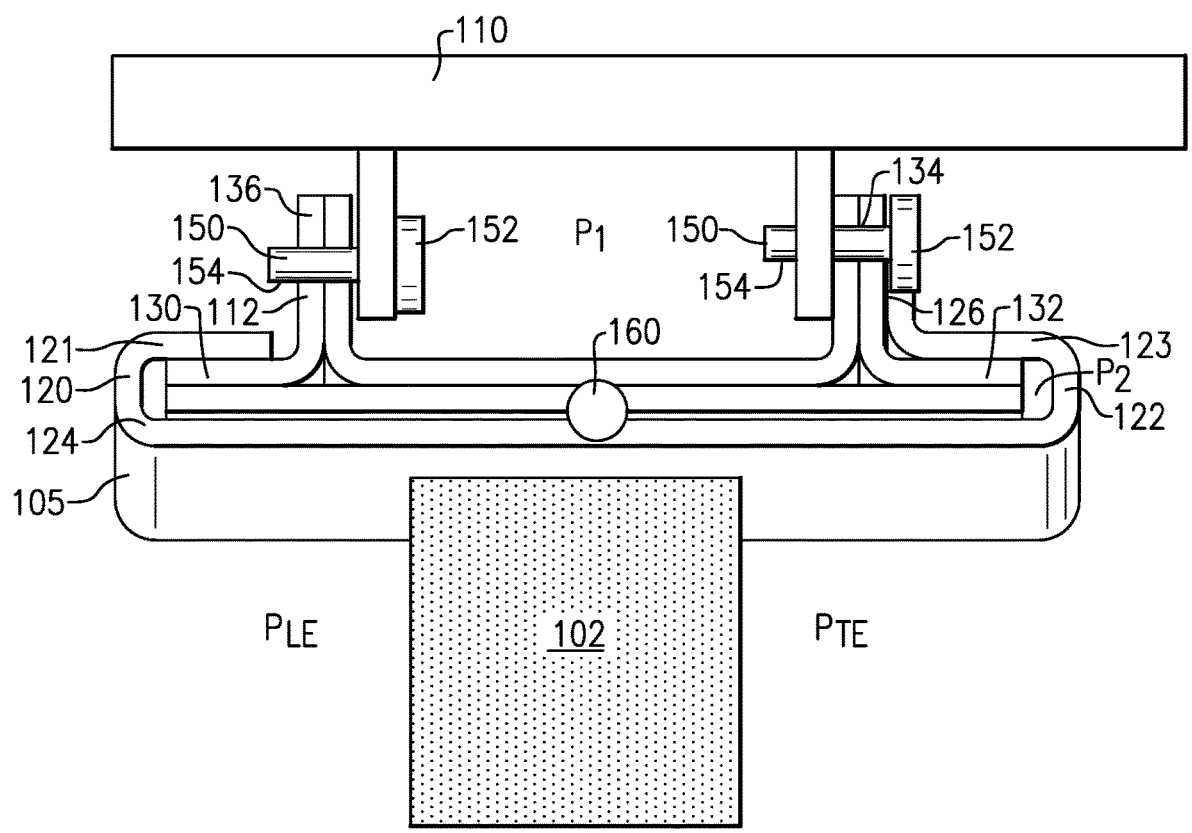
FIG. 8 illustrates a cross-section of a blade outer air seal assembly.

FIG. 8 illustrates the example BOAS assembly 104. The carrier 112 is secured to the support structure 110 via pins 150 to hold the BOAS segment 105 radially outward of the blade 102. The pins 150 each have a head 152 and a body 154 that extends through the slots 134, 136. In some examples, the head 152 may help prevent rotation of the carrier 112 relative to the BOAS segment 105. The aft pin 150 may extend through the slot 128 in the BOAS segment 105. In the illustrated example, the pins 150 are all inserted in an axially forward direction. In other embodiments, some or all of the pins 150 may be inserted in an axially aft direction. Although a pin 150 is shown, other attachment mechanisms may be used to secure the carrier 112 to the support structure 110.

In some examples, a seal 160 is arranged between the BOAS segment 105 and the carrier 112. In one example, a first pressure $P_1$ radially outward of the base 118 is larger than a pressure $P_2$ between the carrier 112 and the BOAS segment 105. The seal 160 may permit different pressures within the assembly between the front and back portions. The pressure at the leading edge $P_{LE}$ may be different from the pressure at the trailing edge $P_{TE}$. Controlling pressures within the assembly may help control the pressure gradient within the assembly 104.

The assembly 104 is assembled by first sliding the BOAS segment 105 circumferentially onto the carrier 112. The carrier 112 is then slid radially up to the support structure 110, and the pins 150 are inserted in an axial direction. This arrangement permits individual BOAS segment 105 and carriers 112 to be removed without disassembling the entire assembly 104.

Known CMC BOAS assemblies include a CMC BOAS secured to a metallic carrier. This arrangement may cause thermal mismatch between the BOAS and the carrier. The disclosed CMC BOAS assembly with a CMC carrier provides a simple ply arrangement, and reduces thermal stress and mechanical stress by reducing thermal mismatch between the BOAS and the carrier. The reduced thermal mismatch may also permit tighter tolerances between the BOAS segment and the carrier. The CMC BOAS and carrier may lower the weight of the turbine section. The BOAS segment provides a large mating surface for mating with the carrier. The carrier and BOAS segment have many surfaces that can be used for sealing. The BOAS segment arrangement also enables a thinner ply construction by transferring some of the load to the carrier. The thinner ply construction of the BOAS segment may reduce thermal stresses.

In this disclosure, "generally axially" means a direction having a vector component in the axial direction that is greater than a vector component in the circumferential direction, "generally radially" means a direction having a vector component in the radial direction that is greater than a vector component in the axial direction and "generally circumferentially" means a direction having a vector component in the circumferential direction that is greater than a vector component in the axial direction.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A blade outer air seal, comprising:
   a base portion;
   a first wall and a second wall extending radially from the base portion, the first wall axially spaced from the second wall, the first and second walls extending in a circumferential direction;
   a first hook extending from the first wall, and a second hook extending from the second wall, the first and second hooks extending in an axial direction towards one another to form a passage that extends in the circumferential direction, the passage configured to receive a carrier, the first and second walls, the first and second hooks, and the base portion have the same thickness; and
   a tab extending radially outward from the second hook, the tab configured to engage with the carrier, wherein the blade outer air seal is a ceramic material and formed from twelve or fewer laminate plies.

2. The blade outer air seal of claim 1, comprising a second tab extending radially outward from the second hook to form an opening between the tab and the second tab.

3. A carrier for a blade outer air seal, comprising:
   a base extending from a first axial side to a second axial side and from a first circumferential side to a second circumferential side;
   a first rail and a second rail extending radially outward from the base, the first and second rails spaced apart from one another in an axial direction; and
   the first rail is spaced from the first axial side to form a front base portion and the second rail is spaced from the second axial side to form an aft base portion, the front and aft base portions configured to engage with a blade outer air seal segment.

4. The carrier of claim 3, wherein a slot is formed in at least one of the first and second rails, the slot configured to receive a pin.

5. The carrier of claim 4, wherein the slot extends in the circumferential direction.

6. The carrier of claim 3, wherein the carrier is a ceramic material.

7. The carrier of claim 6, wherein the carrier is formed from a plurality of laminate plies.

8. A blade outer air seal assembly, comprising:
   a blade outer air seal having a plurality of segments extending circumferentially about an axis and mounted in a carrier;
   at least one of the plurality of segments having a first wall and a second wall axially spaced from one another and a base portion extending from the first wall to the second wall to form a passage between the first and second walls; and
   the carrier having a first rail and a second rail extending from a base, and a portion of the carrier is arranged within the passage, wherein the carrier is a ceramic material.

9. The blade outer air seal assembly of claim 8, wherein a first hook extends from the first wall, and a second hook extends from the second wall, the first and second hooks are radially outward of the base of the carrier.

10. The blade outer air seal assembly of claim 8, wherein a tab extends radially outward from the second hook, the tab engages with one of the first rail and the second rail.

11. The blade outer air seal assembly of claim 8, wherein a slot is formed in at least one of the first and second rails, the slot configured to receive a pin.

12. The blade outer air seal assembly of claim 8, wherein the at least one segment is a ceramic material.

13. The blade outer air seal assembly of claim 12, wherein the at least one segment is formed from a plurality of laminate plies.

14. The blade outer air seal assembly of claim 13, wherein the at least one segment is formed from twelve or fewer laminate plies.

15. The blade outer air seal assembly of claim 8, wherein the base of the carrier extends from a first axial side to a second axial and the first rail is spaced from the first axial side to form a front base portion and the second rail is spaced from the second axial side to form an aft base portion, the front and aft base portions configured to engage with the at least one segment.

16. The blade outer air seal assembly of claim 10, wherein the second rail is aft of the first rail and the tab engages with the second rail.

17. The blade outer air seal assembly of claim 10, wherein a slot is formed in at least one of the first and second rails, the slot configured to receive a pin.

18. The blade outer air seal assembly of claim 17, comprising a second tab extending radially outward from the second hook to form an opening between the tab and the second tab.

19. The blade outer air seal assembly of claim 18, wherein the pin extends through the opening.

* * * * *